United States Patent
Sato

(10) Patent No.: US 11,921,060 B2
(45) Date of Patent: Mar. 5, 2024

(54) SAMPLE HOLDER UNIT FOR SINGLE-CRYSTAL X-RAY STRUCTURE ANALYSIS APPARATUS

(71) Applicant: Rigaku Corporation, Tokyo (JP)

(72) Inventor: Takashi Sato, Tokyo (JP)

(73) Assignee: Rigaku Corporation, Tokyo (JP)

(*) Notice: Subject to any disclaimer, the term of this patent is extended or adjusted under 35 U.S.C. 154(b) by 246 days.

(21) Appl. No.: 17/295,865

(22) PCT Filed: Nov. 21, 2019

(86) PCT No.: PCT/JP2019/045702
§ 371 (c)(1),
(2) Date: May 20, 2021

(87) PCT Pub. No.: WO2020/105728
PCT Pub. Date: May 28, 2020

(65) Prior Publication Data
US 2021/0396690 A1 Dec. 23, 2021

(30) Foreign Application Priority Data
Nov. 22, 2018 (JP) .................................. 2018-219782

(51) Int. Cl.
*G01N 23/20025* (2018.01)
*G01N 23/205* (2018.01)
*G01N 23/207* (2018.01)

(52) U.S. Cl.
CPC ..... *G01N 23/20025* (2013.01); *G01N 23/205* (2013.01); *G01N 23/207* (2013.01)

(58) Field of Classification Search
None
See application file for complete search history.

(56) References Cited

U.S. PATENT DOCUMENTS

| 6,918,698 B2 | 7/2005 | Nordmeyer et al. |
| 7,274,769 B2 | 9/2007 | Nordmeyer et al. |

(Continued)

FOREIGN PATENT DOCUMENTS

| JP | H06-194276 A | 7/1994 |
| JP | H11-304999 A | 11/1999 |

(Continued)

OTHER PUBLICATIONS

European Patent Office, EP Search Report issued in EP Application No. 19 887 709.4, dated Jun. 27, 2022, 8 pages.

(Continued)

*Primary Examiner* — David P Porta
*Assistant Examiner* — Mamadou Faye
(74) *Attorney, Agent, or Firm* — ASLAN LAW, P.C.

(57) ABSTRACT

A sample holder unit for a single-crystal X-ray structure analysis apparatus that quickly, surely and easily performs structure analysis with a crystalline sponge, the structure analysis inclusive of an operation of attaching a sample soaked in the crystalline sponge thereto, even if having no specialized knowledge, is provided. There are provided a sample holder, and an applicator comprising an opening 302 and a storing space in which the sample holder is stored, and a pull-out prevention part that selectively prevents and releases the sample holder stored in the storing space from being pulled out from the opening 302, wherein the pull-out prevention part comprises an operation part that releases pull-out prevention thereof in a state where the sample holder stored in the applicator is attached to the goniometer.

16 Claims, 13 Drawing Sheets

(56) References Cited

U.S. PATENT DOCUMENTS

| | | | |
|---|---|---|---|
| 7,696,991 | B2 | 4/2010 | Higashi |
| 9,757,515 | B1 | 9/2017 | Patel |
| 10,190,952 | B2 | 1/2019 | Fujita et al. |
| 10,684,198 | B2 | 6/2020 | Fujita et al. |
| 2003/0152194 | A1 | 8/2003 | Nordmeyer et al. |
| 2005/0163280 | A1 | 7/2005 | Nordmeyer et al. |
| 2007/0005268 | A1 | 1/2007 | Higashi |
| 2007/0228049 | A1 | 10/2007 | Nordmeyer et al. |
| 2014/0314206 | A1* | 10/2014 | Yasukawa ............ G01N 23/205 378/71 |
| 2015/0219533 | A1* | 8/2015 | Fujita ...................... C30B 29/58 428/221 |
| 2017/0219500 | A1 | 8/2017 | Fujita et al. |
| 2019/0137367 | A1 | 5/2019 | Fujita et al. |

FOREIGN PATENT DOCUMENTS

| | | |
|---|---|---|
| JP | 2003-083412 A | 3/2003 |
| JP | 2007-003394 A | 1/2007 |
| JP | 2013-156218 A | 8/2013 |
| JP | WO 2014/038220 A1 | 3/2014 |
| JP | 2014-130063 A | 7/2014 |
| JP | WO 2016/017770 A1 | 7/2017 |
| JP | 2018-155680 A | 10/2018 |
| WO | WO 2011/115223 A1 | 9/2011 |
| WO | WO 2015/132909 A1 | 9/2015 |

OTHER PUBLICATIONS

U.S. Office Action issued in U.S. Appl. No. 17/295,864, USPTO, USA, dated Feb. 14, 2023, 23 pages.
International Search Report issued in PCT Application No. PCT/JP2019/045701, JPO, Japan, dated Feb. 18, 2020, 2 pages.
EP Search Report issued in EP Application No. 19 886 784.8, dated Jul. 4, 2022, EPO, Germany, 6 pages.
Yasuhide Inokuma, Makoto Fujita et al; "X-rayanalysis on the nanogram to microgram scale using porous complexes"; Nature 495, 461-466.; Mar. 28, 2013.
Hoshino et al., "The crystalline sponge method updated", IUCrJ, (2016), 3, 139-151.
Yasuhide Inokuma, "Crystal sponge' method overturns common sense of crystal structure analysis", Chemistry, vol. 68, No. 8, pp. 35-40, in particular, p. 39, fig.5, non-official translataion, Aug. 1, 2013.
Inokuma, Yasuhide et al., "X-ray crystallography of extremely small amount of compounds by crystal sponge method", Farumashia , 2014, vol. 50, No. 8, pp. 756-761, column "5. Application of crystal sponge method", fig. 4, non-official translation.
U.S. Office Action (final) issued in U.S. Appl. No. 17/295,864, USA, USPTO, dated Aug. 3, 2023, 38 pages.
Gonzalez et al. "Structural characterization of framework-gas interactions in the metal- organic framework Co2(dobdc) by in situ single-crystal Xray diffraction" Chem. Sci., 2017, 8, 4387-4398 (first published Apr. 19, 2017), 12 pages.
U.S. Appl. No. 17/295,864, filed May 20, 2021.

* cited by examiner

SAMPLE HOLDER UNIT FOR SINGLE-CRYSTAL X-RAY STRUCTURE ANALYSIS APPARATUS

CROSS-REFERENCE TO RELATED APPLICATIONS

This application claims priority to JP Patent Application No. 2018-219782 filed on Nov. 22, 2018, and this application claims priority to and is a 371 of international PCT Application No. PCT/JP2019/045702 filed on Nov. 21, 2019, the entire contents of which are hereby incorporated by reference.

TECHNICAL FIELD

The present invention relates to a next-generation single-crystal X-ray structure analysis apparatus capable of analyzing a structure of a material by an aggregative microstructure such as its atomic or molecular arrangement; and relates specifically to a sample holder unit for single-crystal X-ray structure analysis apparatus as a tool for performing processing including preparation of a single-crystal sample that becomes an analysis object.

BACKGROUND ART

In research and development for new devices and materials, the materials are ordinarily synthesized and evaluated to determine the next research policy based on the foregoing. In a structure analysis of a material using X-ray diffraction for performing material development in a short period of time, a search method of a material structure centering on the material structure analysis capable of efficiently performing the structure analysis, and an X-ray structure analysis used therein are indispensable for efficiently searching the material structure that realizes the function/physical property of an object material.

However, it has been difficult for those other than X-ray specialists to perform the structure analysis based on the results obtained by the foregoing method. Therefore, there has been a demand for an X-ray structure analysis system with which the structure analysis can be performed by anyone who is not even a specialist of X-rays has been demanded. In this regard, as is known from the following Patent Document 1, the single-crystal X-ray structure analysis has gained attention as a method capable of catching a precise and highly accurate three-dimensional structure of molecules.

On the other hand, in this single-crystal X-ray structure analysis, there has been such a large constraint that a single-crystal needs to be prepared by crystallizing a sample. However, as is known from not only the following Non-Patent Documents 1 and 2 but also Patent Document 2, the single-crystal X-ray structure analysis becomes widely applicable for those including a liquid compound that cannot be crystallized, a sample incapable of acquiring a sufficient amount for crystallization, and so forth via development of a material called "crystalline sponge" (for example, a porous complex crystal in which countless pores each having a diameter of 0.5 to 1 nm are formed).

PRIOR ART DOCUMENT

Patent Document

Patent Document 1: Japanese Unexamined Patent Application Publication No. 2007-3394

Patent Document 2: Re-publication of PCT International Publication WO2016/017770

Non-Patent Document

Non-Patent Document 1: Makoto Fujita; X-ray analysis on the nanogram to microgram scale using porous complexes; Nature 495, 461-466; 28 Mar. 2013

Non-Patent Document 2: Hoshino et al. (2016), The updated crystalline sponge method IUCrJ, 3, 139-151

SUMMARY OF THE INVENTION

Problems to be Solved by the Invention

However, in the single-crystal X-ray structure analysis as becoming a conventional technique in which the above-described crystalline sponge is used, it is necessary to quickly and accurately perform a step of soaking a sample of a very small amount of approximately several ng to several µg separated by every kind of devices in a framework of a very small and fragile crystalline sponge having a size of approximately 100 µm, and further a step of accompanying fine and precise operations in which the very small crystalline sponge in which the sample is soaked is taken out; is attached to a tool; and is installed at the X-ray irradiation position inside a single-crystal X-ray structure analysis apparatus. In addition, these fine and precise operations carried out in a short period of time largely affect the measurement result of the sample after being soaked in the crystalline sponge, thereby being very important operations.

Accordingly, the present invention has been achieved in view of problems in the above-described conventional technique, and the objective is, specifically, to provide a sample holder unit capable of quickly, surely and easily performing single-crystal X-ray structure analysis with a crystalline sponge without conventionally fine and precise operations for which rapidness is required being accompanied, the operations including a removal operation of a sample soaked in a very small and fragile crystalline sponge and an attachment operation to an apparatus, even if not having specialized knowledge of X-ray structure analysis, in other words, to provide the sample holder unit used in a single-crystal X-ray structure analysis in order to realize a high-yield, efficient, very versatile and user-friendly single-crystal X-ray structure analysis apparatus.

Means to Solve the Problems (1) In order to achieve the above-described object, it is a feature that the sample holder unit according to the present invention is a sample holder unit comprising a sample holder used in a single-crystal X-ray structure analysis apparatus, and an applicator in which the sample holder is stored, the sample holder comprising a base part attached to a goniometer in the single-crystal X-ray structure analysis apparatus, the base part formed to have a sample introduction structure into which a sample to be soaked in a porous complex crystal is introduced; and a holding part that holds the porous complex crystal capable of soaking the sample in a plurality of fine pores formed therein, the holding part formed on the base part, and the applicator comprises an opening and a storing space in which the sample holder is stored, and a pull-out prevention part that selectively prevents and releases the sample holder stored in the storing space from being pulled out from the opening, wherein the pull-out prevention part comprises an operation part that releases pull-out prevention thereof in a state where the sample holder stored in the applicator is attached to the goniometer.

(2) Further, it is a feature that in the sample holder unit according to the present invention, the applicator further comprises a separation mechanism to separate the sample holder therefrom by releasing the pull-out prevention with the operation part.

(3) Further, it is a feature that in the sample holder unit according to the present invention, the separation mechanism comprises a seal part with which a contact surface between the applicator and the sample holder stored therein is airtightly maintained.

(4) Further, it is a feature that in the sample holder unit according to the present invention, the pull-out prevention part prevents the sample holder from being pulled out therefrom in a state of pressing the sample holder to the seal part.

(5) Further, it is a feature that in the sample holder unit according to the present invention, the pull-out prevention part that protrudes toward the opening of the applicator comprises a swing lever that prevents the sample holder from being pulled out therefrom.

(6) Further, it is a feature that in the sample holder unit according to the present invention, the pull-out prevention part that protrudes toward the opening of the applicator has a shape that prevents the sample holder from being pulled out therefrom.

(7) Further, it is a feature that in the sample holder unit according to the present invention, the pull-out prevention part has an inclined surface at an end of a sliding surface of the pull-out prevention part with the sample holder.

(8) Further, it is a feature that in the sample holder unit according to the present invention, the applicator has a pair of parallel guide rails provided at both side portions of the applicator, and the pull-out prevention part slides to be engaged with the pair of parallel guide rails.

(9) Further, it is a feature that in the sample holder unit according to the present invention, the applicator has a pair of parallel guide rails provided at both side portions of the applicator; the pull-out prevention part comprises engagement parts that slide to be engaged with the pair of parallel guide rails; and the pair of parallel guide rails and the engagement parts each whose cross-section is U-shaped are formed.

Effect of the Invention

According to a sample holder unit for a single-crystal X-ray structure analysis apparatus of the present invention as described above, an operation of soaking a sample in a fragile crystalline sponge in the single-crystal X-ray structure analysis apparatus, followed by an operation of attaching it to a goniometer tip can be quickly, precisely and easily carried out without accompanying conventionally precise and fine operations, and thus single-crystal X-ray structure analysis with a crystalline sponge can be quickly, precisely and easily carried out. Thus, it becomes possible to make the single-crystal X-ray structure analysis with the crystalline sponge be easily usable, and to widely spread it.

DETAILED DESCRIPTION OF EMBODIMENTS

Next, the sample holder unit used in the single-crystal X-ray structure analysis apparatus in which a crystalline sponge is utilized, according to one embodiment of the present invention, are described in detail referring to the attached drawings. In addition, the expression of "A or B" in the present application means "at least one of A and B", and includes "A and B" unless there are exceptional circumstances where there exists no possibility of A and B.

Figure 1:
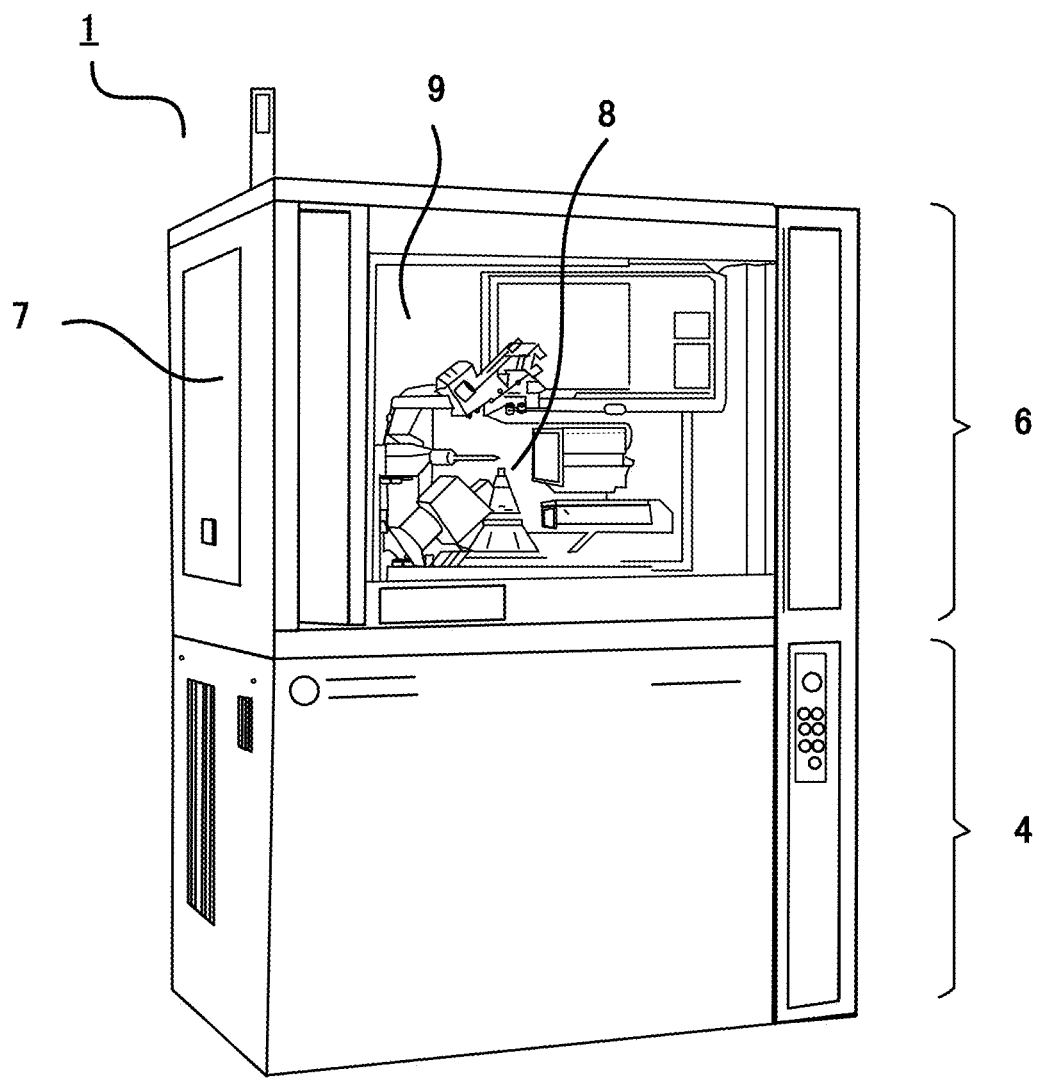
FIG. 1 is a diagram showing a whole configuration of a single-crystal X-ray structure analysis apparatus provided with a single-crystal X-ray diffractometer according to one embodiment of the present invention.

The attached FIG. 1 shows the entire appearance configuration of a single-crystal X-ray structure analysis apparatus provided with a single-crystal X-ray diffractometer according to one embodiment of the present invention, and as is clear from the figure, the single-crystal X-ray structure analysis apparatus 1 comprises a base stand 4 in which a cooling device and an X-ray generation power supply unit are stored, and an X-ray protection cover 6 placed on the base stand 4.

The X-ray protection cover 6 is provided with a casing 7 for surrounding the single-crystal X-ray diffractometer 9, a door 8 provided in front of the casing 7, and so forth. The door 8 provided in front of the casing 7 is openable, and in this open state, various operations can be performed for the internal single-crystal X-ray diffractometer 9. In addition, the present embodiment as shown in the figure is directed to the single-crystal X-ray structure analysis apparatus 1 provided with the single-crystal X-ray diffractometer 9 for performing a structure analysis of a material using the crystalline sponge mentioned below.

Figure 2:
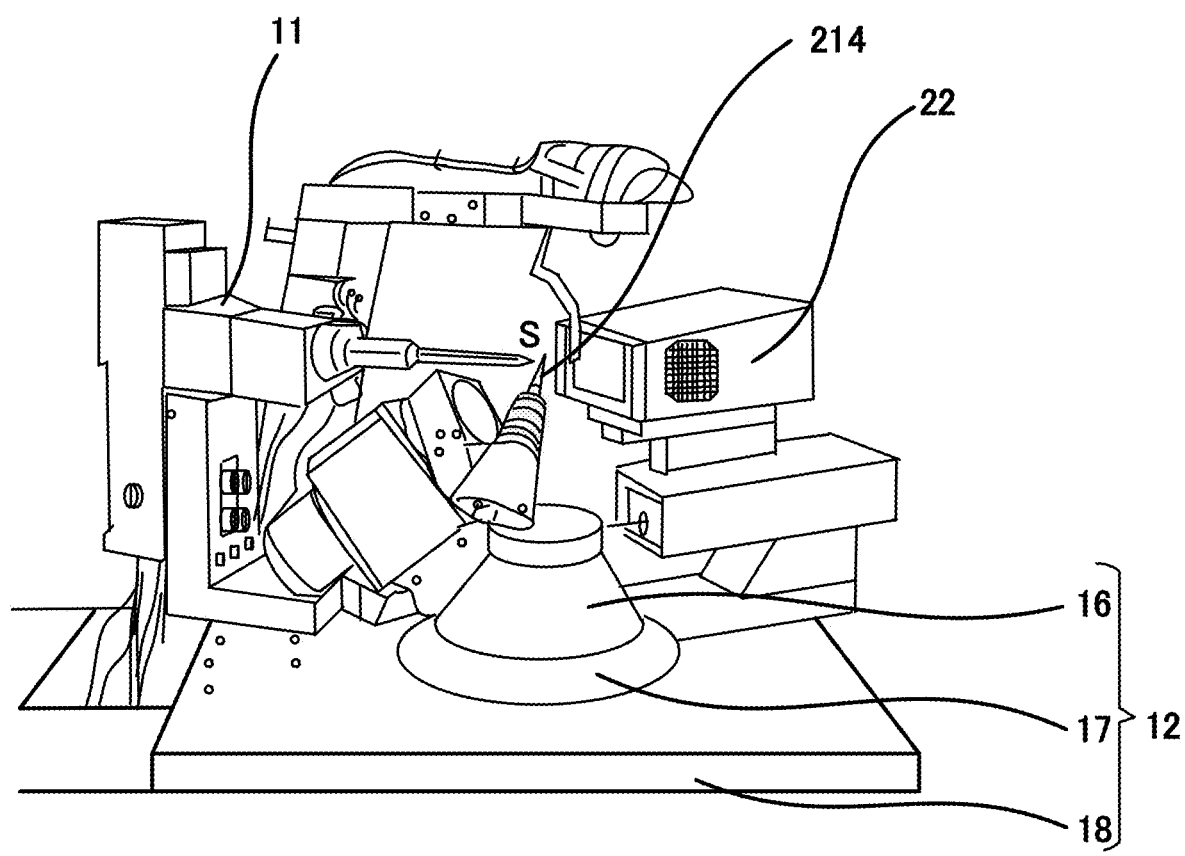
FIG. 2 is a diagram showing a configuration of the above-described single-crystal X-ray diffractometer.

The single-crystal X-ray diffractometer 9 comprises an X-ray tube 11 and a goniometer 12, as shown in FIG. 2 as well. The X-ray tube 11 comprises a filament, a target (referred to also as "anticathode") arranged so as to be opposed to the filament, and a casing for airtightly storing them, though not shown in the figure herein. This filament subjected to current applied by the X-ray generation power supply unit stored in the base stand 4 of FIG. 1 generates heat to emit thermal electrons. Further, a high voltage is applied between the filament and the target by the X-ray generation power supply unit, and the thermal electrons emitted from the filament are accelerated by the high voltage, and collide with the target. This collision area forms an X-ray focus, and X-rays are generated from the X-ray focus, and are spread out. In more detail, though not shown in the figure herein, the X-ray tube 11 comprising a microfocus tube and an optical element such as a multilayer focusing mirror or the like enables irradiation with higher brightness beam, and can also be selected from a radiation source such as Cu, Mo, Ag or the like. As exemplified above, the filament, the target arranged so as to be opposed to the filament, and the casing for airtightly storing them serve as an X-ray source, and a configuration for X-ray irradiation comprising the microfocus tube and the optical element such as the multilayer focusing mirror or the like serves as an X-ray irradiation section.

Further, the goniometer 12 supporting a sample S to be analyzed comprises a θ rotation table 16 that is rotatable with a sample axis line ω passing through an X-ray incident point of the sample S as a center, and a 2θ rotation table 17 that is arranged around the θ rotation table 16 and is rotatable with the sample axis line ω as a center. In addition, according to the present embodiment, the sample S is soaked inside a crystalline sponge previously attached to a part of the sample holder 214 mentioned below. Drive devices (not shown in the figure) for driving the above-described θ rotation table 16 and 2θ rotation table 17 are stored inside a base 18 of the goniometer 12, and the θ rotation table 16 is driven by these drive devices to be intermittently or continuously rotated at a predetermined angular speed so as to make a so-called θ rotation. Further, the 2θ rotation table 17 is driven by these drive devices to be intermittently or continuously rotated so as to make a so-called 2θ rotation. The above-described drive devices can be constituted from any structure, and for example, can be constituted from a power transmission structure comprising a worm and a worm wheel.

An X-ray detector 22 is placed on a part of the outer periphery of the goniometer 12, and the X-ray detector 22 is constituted from for example, CCD type and CMOS type two-dimensional pixel detectors, a hybrid type pixel detector, or the like. In addition, an X-ray detection measurement section means a configuration in which X-rays diffracted or scattered by the sample are detected and measured, and comprises the X-ray detector 22 and a control section that controls the same.

The single-crystal X-ray diffractometer 9 is constituted as described above, and thus the sample S is θ-rotated with the sample axis line ω as a center by the θ rotation of the θ rotation table 16 in the goniometer 12. During the θ rotation of this sample S, X-rays generated from the X-ray focus inside the X-ray tube 11, that is directed to the sample S enter the sample S at a predetermined angle, and are diffracted/scattered. That is, the incident angle of X-rays entering the sample S changes depending on the θ rotation of the sample S.

When the Bragg diffraction condition between an incident angle of X-rays entering the sample S and a crystal lattice plane is satisfied, diffraction X-rays are generated from the sample S. The diffraction X-rays are received by the X-ray detector 22 to measure an X-ray intensity thereof. From those described above, an angle of the X-ray detector 22 with respect to the incident X-rays, that is, an intensity of the diffraction X-rays corresponding to a diffraction angle is measured, and a crystal structure concerning the sample S and so forth are analyzed from this measurement result.

Figure 3A:
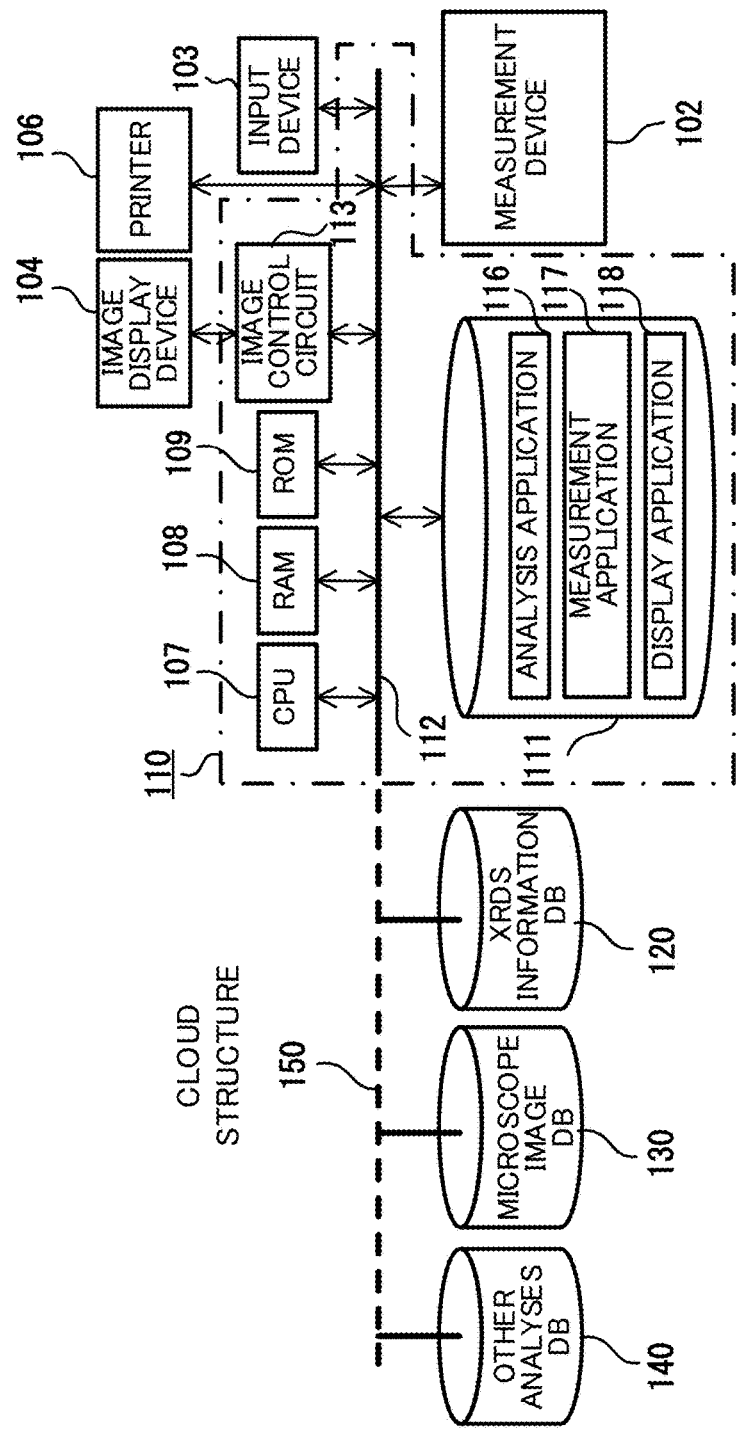
FIG. 3A is a block diagram showing an electrical configuration inside the above-described single-crystal X-ray structure analysis apparatus.

Then, FIG. 3A shows one example of the detail of an electrical internal configuration constituting a control section 110 in the above-described single-crystal X-ray structure analysis apparatus. In addition, as a matter of course, the present invention is not limited to the following embodiments according to the present invention.

This single-crystal X-ray structure analysis apparatus 1 includes the above-described internal configuration and further comprises a measurement device 102 for measuring a suitable material used as a sample; an input device 103 constituted from a keyboard, a mouse and so forth; an image display device 104 as display means; a printer 106 as means for printing and outputting the analysis result; CPU (Central Processing Unit) 107; RAM (Random Access Memory) 108; ROM Read Only Memory) 109; a hard disk 111 as an external storage medium, and so forth. These elements are electrically connected mutually by a bus 112.

The image display device 104 constituted from an image display unit such as a CRT display, a liquid-crystal display or the like displays an image on a screen in accordance with an image signal generated by an image control circuit 113. The image control circuit 113 generates the image signal based on image data input therein. The image data input in the image control circuit 113 is generated by an operation of every kind of calculation means, achieved by a computer comprising CPU 107, RAM 108, ROM 109, and the hard disk 111. An inkjet plotter, a dot printer, an inkjet printer, an electrostatic transfer printer, or any other printing unit having arbitrary structure is usable for the printer 106. In addition, the hard disk 111 can also be constituted from a magneto-optical disk, a semiconductor memory, or any other storage medium having arbitrary structure.

Analysis application software 116 for managing the overall operation of the single-crystal X-ray structure analysis apparatus 1, measurement application software 117 for managing the operation of the measurement processing using the measurement device 102, and display application software 118 for managing the operation of the display processing using the image display device 104 are stored inside the hard disk 111. A predetermined function is achieved after reading these pieces of application software from the hard disk 111, as needed, to transfer them to RAM 108.

This single-crystal X-ray structure analysis apparatus 1 further comprises, for example, a database placed in a cloud area, the database for storing every kind of measurement results including measurement data obtained by the above-described measurement device 102. Referring to an example of the figure, as is explained below, shown are an XRDS information database 120 that stores XRDS image data obtained by the above-described measurement device 102, and a microscope image database 130 that stores actually observed images obtained by the microscope, and further shown are for example, measurement results obtained via analysis performed with XRF, not X-rays but Raman ray or the like, and the other analysis database 140 that stores physical property information. In addition, these databases are not necessarily stored inside the single-crystal X-ray structure analysis apparatus 1, and for example, they may be provided outside and be communicably connected mutually via a network 150 or the like.

Figure 3B:
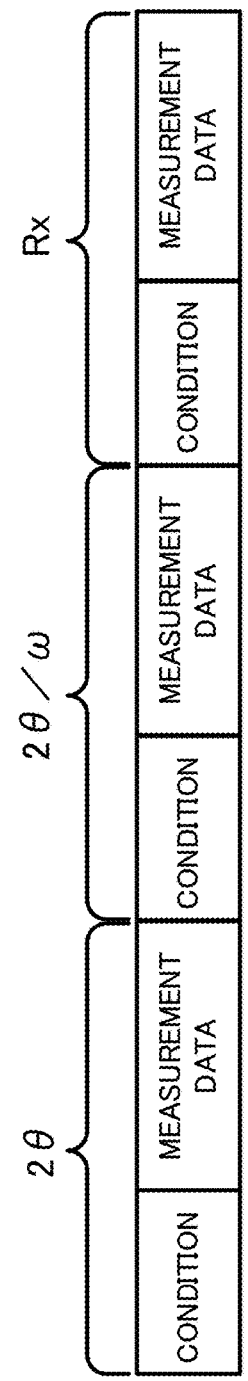

A method of storing individual measurement data inside an individual file is also taken into account as a file management method for storing a plurality of pieces of measurement data inside a data file, but according to the present embodiment, as shown in FIG. 3B, the plurality of pieces of measurement data are set to be continuously stored inside one data file. In addition, referring to FIG. 3B, storage areas each in which "condition" is written are an area for storing every kind of information including device information and measurement conditions when obtaining the measurement data.

As such measurement conditions, (1) name of measurement object material, (2) type of measurement device, (3) measurement temperature range, (4) measurement start time, (5) measurement end time, (6) measurement angle range, (7) moving speed in scanning movement system, (8) scanning condition, (9) type of X-rays incident on sample, (10) whether or not to use attachments such as a sample high-temperature device, and so forth, are conceivable and every kind of other conditions is also conceivable.

Figure 4:
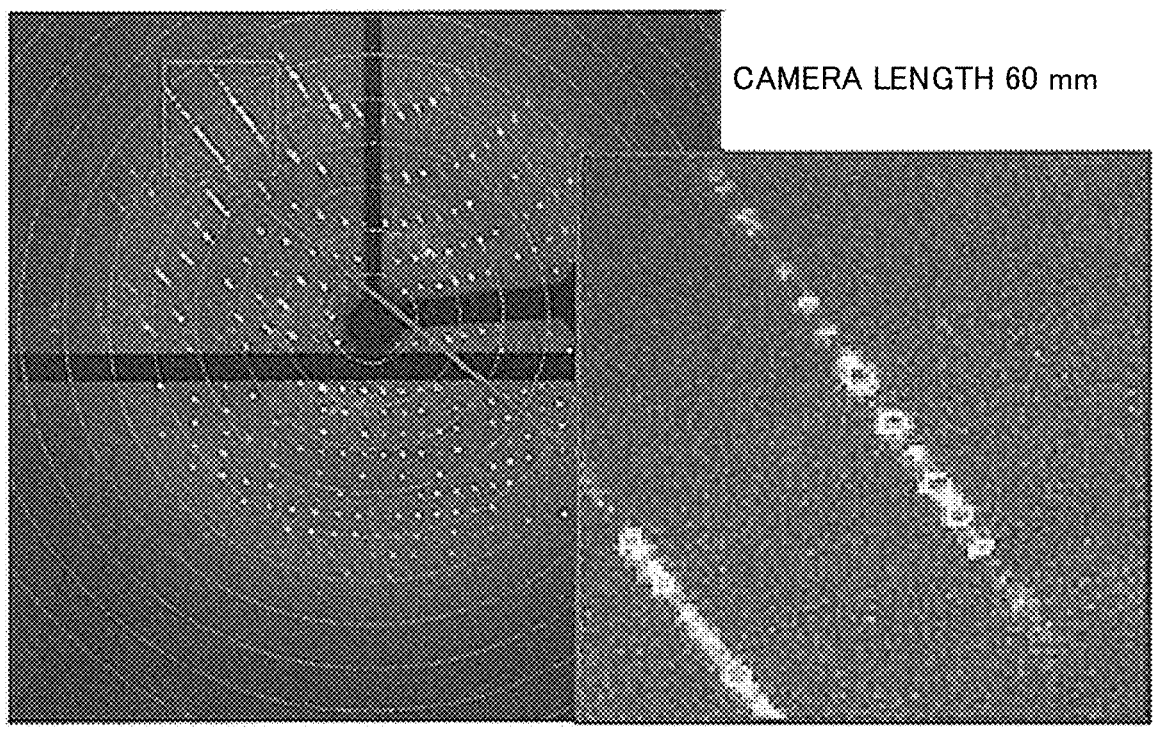
FIG. 4 is a diagram including a photograph showing an XRDS pattern or an image obtained by the above-described single-crystal X-ray structure analysis apparatus.

An XRDS (X-ray Diffraction and Scattering) pattern or an image (Refer to FIG. 4) is obtained by receiving/accumulating X-rays received on a flat plane that is a two-dimensional space of the X-ray detector 22 constituting the above-described measurement device 102 for each pixel arranged in planar array, that constitutes the detector, and by measuring an intensity thereof. For example, a pattern or an image on a two-dimensional space of r and θ can be obtained by detecting the intensity of X-rays received via an integral, for each pixel of the X-ray detector 22.

<Measurement Application Software>

The XRDS pattern or the image on an observation space, that is obtained by diffraction and scattering of X-rays caused by an object material for irradiation of the X-rays reflects information of an electron density distribution in an actual space of the object material. However, the XRDS pattern being on the two-dimensional space of r and θ does not directly represents symmetry in the actual space of the object material as a three-dimensional space. Accordingly, it is generally difficult to specify the(spatial) arrangement of atoms and molecules that constitute the material with only the existing XRDS image, and thus a specialized knowledge of X-ray structure analysis is required. Therefore, according to the present example, automatization is achieved by adopting the above-described measurement application software.

Figure 5A:
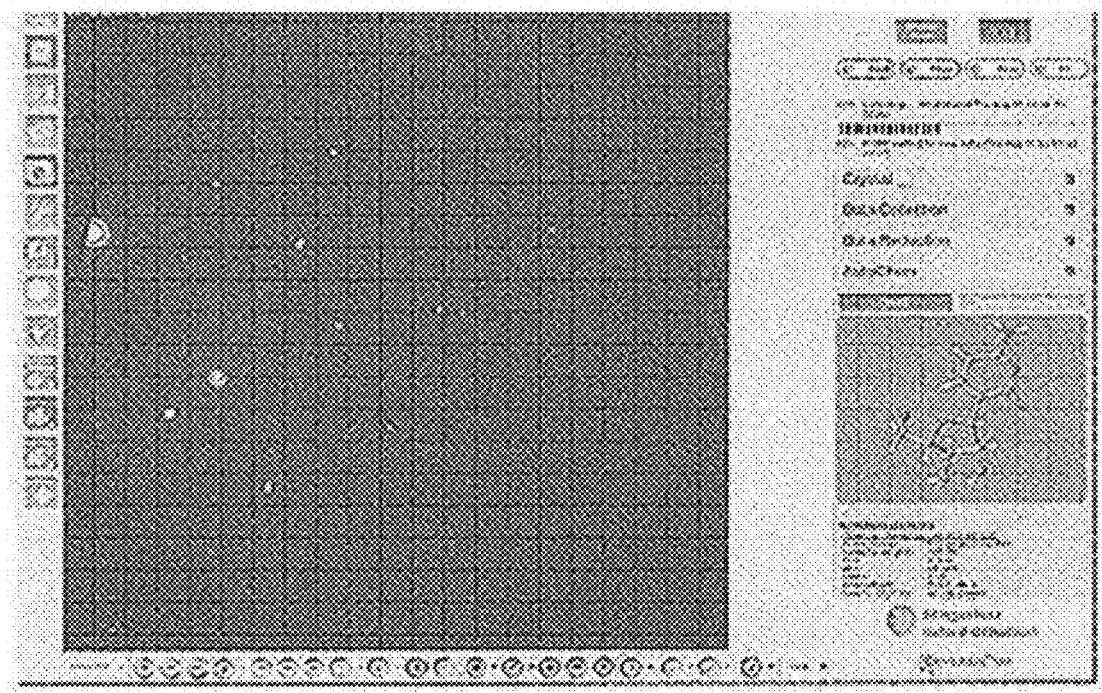
FIG. 5A(5B) is a diagram including a photograph showing one example of a screen obtained by executing X-ray diffraction data measurement/processing software on the above-described single-crystal X-ray structure analysis apparatus.
Figure 5B:
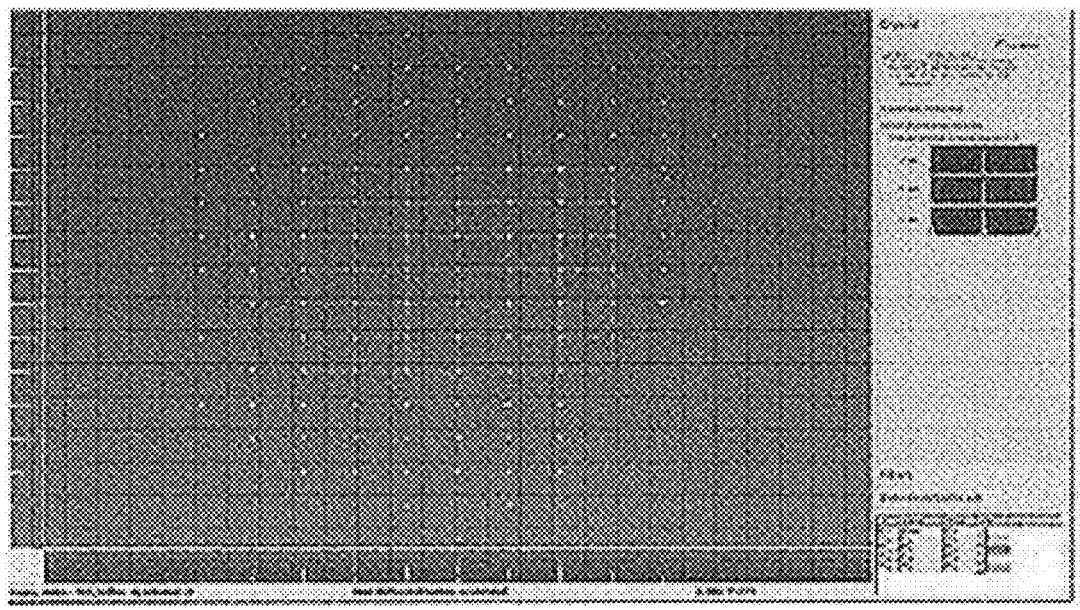
Figure 6:
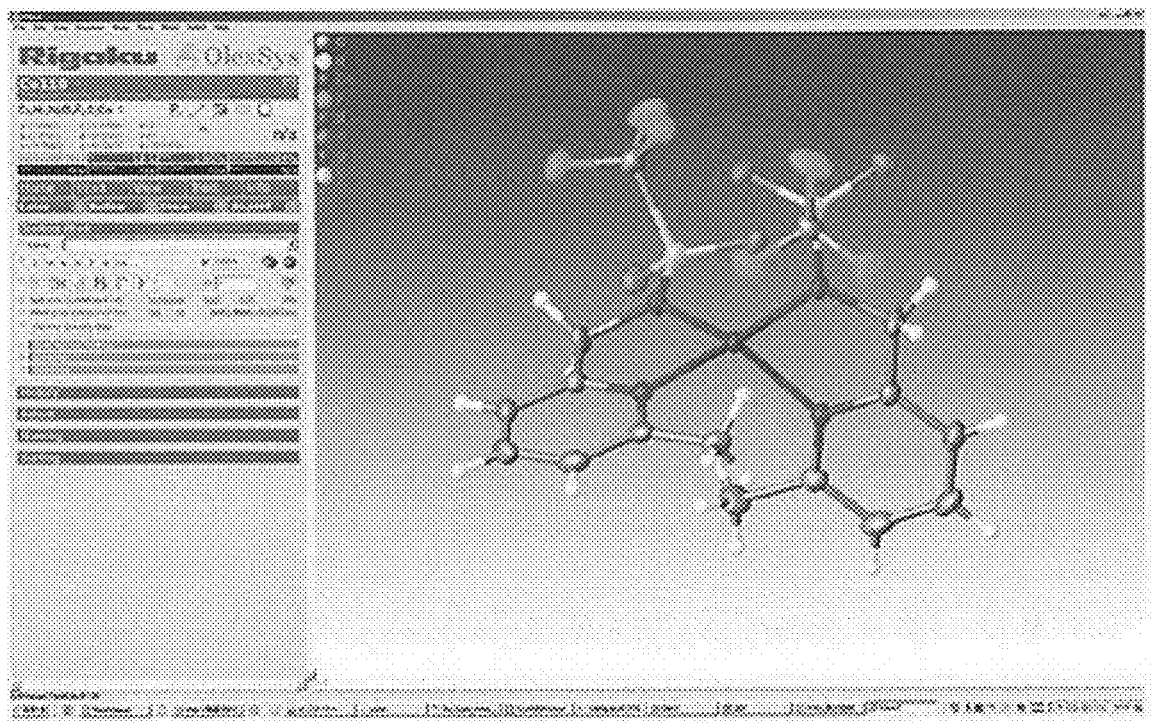
FIG. 6 is a diagram including a screen showing a molecular model prepared using a structure analysis program of the above-described single-crystal X-ray structure analysis apparatus.

For one example, as shown in the execution screens of FIGS. 5A and 5B, X-ray diffraction data measurement/processing software called "CrysAlis$^{Pro}$" that is a platform for single-crystal structure analysis is installed to execute preliminary measurement, setting of measurement conditions, main measurement, data processing and so forth. Further, structure analysis and structure refinement are executed in parallel with X-ray diffraction data collection by installing an automatic structure analysis plug-in called "AutoChem". Then, from space group determination to phase determination, construction and correction of molecular modelling, structure refinement, final reporting, and preparation of a CIF file are executed by a structure analysis program called "Olex$^2$" as also shown in FIG. 6.

The whole structure of the single-crystal X-ray structure analysis apparatus 1, and its function have been described as above, and a crystalline sponge according to the present invention, and devices and tools related thereto are specifically described below in detail, referring to the attached drawings.

<Crystalline Sponge>

As described above, the single-crystal X-ray structure analysis has become widely applicable for those including a liquid compound that cannot be crystallized, a very small amount of a sample with several ng to several µg that is incapable of acquiring a sufficient amount to perform crystallization, or the like via development of a material called "crystalline sponge" as a very small and fragile porous complex crystal having an approximate size of several 10 µm to several 100 µm, in whose inside countless pores each having a diameter of 0.5 to 1 nm are formed.

However, in the current situation, in order to perform soaking (post-crystallization) as crystallization of a sample into a framework of the above-described crystalline sponge, as previously described, required is a step of soaking a very small amount of a sample, approximately several ng to several µg, separated by every kind of pretreatment (separation) devices in a framework of a very small and fragile crystalline sponge having an outer diameter of approximately 100 µm provided via immersion in a preserving solvent such as cyclohexane or the like, inside a container. Examples of the preserving solvent include liquid, a gaseous body (gas), and a supercritical fluid in the middle of them. Subsequently, further required is a step of taking out, from a container, a very small, fragile and difficultly handleable crystalline sponge in a quick manner (in a short period of time in such an extent that the crystalline sponge is not broken due to drying), and accurately attaching it to an X-ray irradiation position inside a single-crystal X-ray diffractometer, more specifically, to a tip of a sample axis of the goniometer 12 (so-called goniometer head pin) while performing centering. These steps are not only fine operations for which high preciseness is required but also those for which rapidness is required for the operator, regardless of presence/absence of a specialized knowledge of X-ray structure analysis, thereby resulting in having a large influence on the measurement result of a sample after being soaked in the crystalline sponge. That is, these operations make single-crystal X-ray structure analysis using a very small crystalline sponge result in low yield, and thus this becomes one of the causes of suppressing the single-crystal X-ray structure analysis using the crystalline sponge from being widely used.

<Sample Holder and Sample Holder Unit>

The present invention that has been accomplished based on the above-described inventor's knowledge enables quickly, surely and easily performing a single-crystal X-ray structure analysis with a very small and fragile crystalline sponge by using a sample holder unit comprising a sample holder for the crystalline sponge (also referred to simply as a sample holder), the sample holder supporting the crystalline sponge as described below, in other words, achieves a high-yield, efficient, very versatile and user-friendly single-crystal X-ray structure analysis apparatus. That is, as to the next-generation single-crystal X-ray structure analysis apparatus according to the present invention, there is a large constraint that the very small and fragile crystalline sponge in which a very small amount of a sample S is soaked is prepared, and further the sample S (crystalline sponge) needs to be taken up from a soaking container and precisely and quickly attached to a predetermined position at the tip of the goniometer 12 in a short and quick period of time in such an extent that the crystalline sponge is not broken due to drying, but specifically in order to achieve the very versatile and user-friendly apparatus, such operations need to be made quickly and easily executable without requiring highly specialized knowledge as well as operation preciseness.

The present invention described below in detail resolves such a problem, that is, provides a sample holder unit for a single-crystal X-ray structure analysis apparatus as a tool for enabling performing an operation of soaking a sample in the crystalline sponge, followed by an operation including attaching it to an apparatus in a high-yield efficient, very versatile and user-friendly manner, by anyone while also using a very small, fragile and difficultly handleable crystalline sponge, and for making it possible to realize the single-crystal X-ray structure analysis apparatus.

Figure 7A:
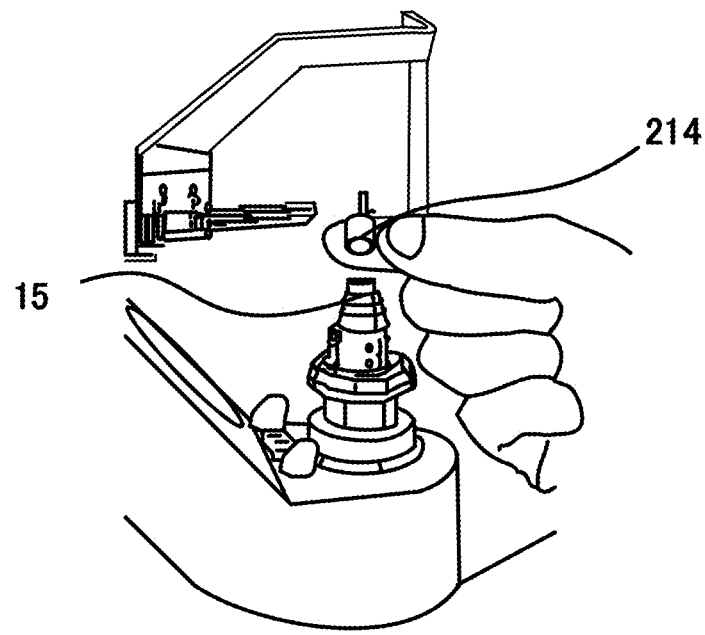
FIG. 7A is a diagram including a photograph showing one example of a structure centering on a goniometer of the above-described single-crystal X-ray diffractometer.
Figure 7B:
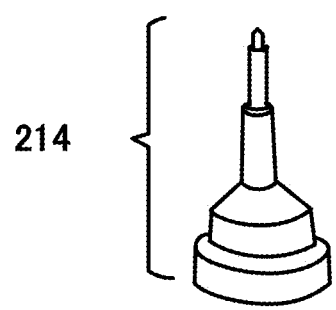

FIG. 7A shows a tip of the goniometer 12 in an enlarged view, and this figure shows a state that, the sample holder 214, being in an enlarged view as FIG. 7B, as a tool where the crystalline sponge 200 soaking a sample to be analyzed that is proposed according to the present invention is attached (mounted) to the goniometer head 15 as a tip of the goniometer 12 in advance. In addition, the sample holder 214, for example, can be attached/detached to/from the goniometer head 15 at the tip of the goniometer 12 by an attaching/positioning mechanism for which magnetic force or the like is used, and can be attached easily and accurately at an exact position by anyone.

Example 1

Figure 8:
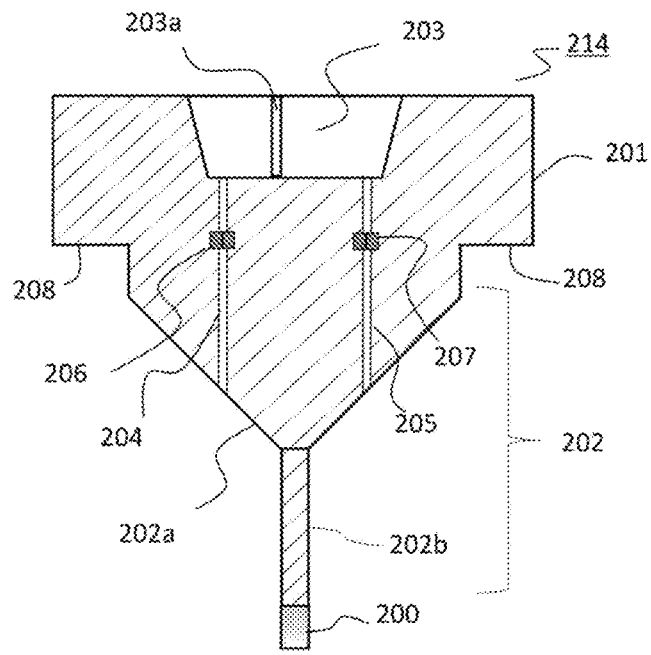
FIG. 8 is a sectional view showing one example of a sample holder to be attached to the above-described goniometer of Example 1 according to the present invention.

FIG. 8 shows a sectional view of the sample holder 214 according to Example 1. The sample holder 214 comprises a disk-shaped base part 201 made of metal or the like, attached to the goniometer head (Refer to FIG. 7A) at the tip of the goniometer 12, and a protrusion part 202 formed in a protrusion shape extending downward from one surface thereof (the lower surface in the figure). The protrusion part 202 comprises s conical part 202a, and a sample holding part (corresponding to the so-called goniometer head pin) 202b formed in a protrusion shape. The crystalline sponge 200 in which the above-described sample to be analyzed is soaked is combinedly attached to the sample holder 214 beforehand at a predetermined position of the tip of the sample holding part 202b.

Further, an attachment part 203 in a recessed truncated cone shape is formed on the other surface (upper surface in the figure) of the base part 201, and a magnet that is not shown in the figure or a projected engagement part (or recessed part) 203a is provided on a contact surface with the goniometer head 15 at the tip of the foregoing goniometer 12 in this attachment part 203. By having this mechanism, the sample holder 214 can be attached/detached to/from the goniometer head 15 at the tip of the goniometer 12, and can be easily and accurately attached thereto by anyone.

The outer diameter on the base part side of the conical part 202a of the sample holder 214 is set to be smaller than the outer diameter of the base part 201, and an annular-shaped step part 208 is formed. Further, through-holes 204 and 205 passing from the base part 201 to the protrusion part 202 are formed as a sample introduction structure, and seal parts 206 and 207 each for airtightly sealing a hole interior are provided in respective through-holes 204 and 205.

Figure 9:
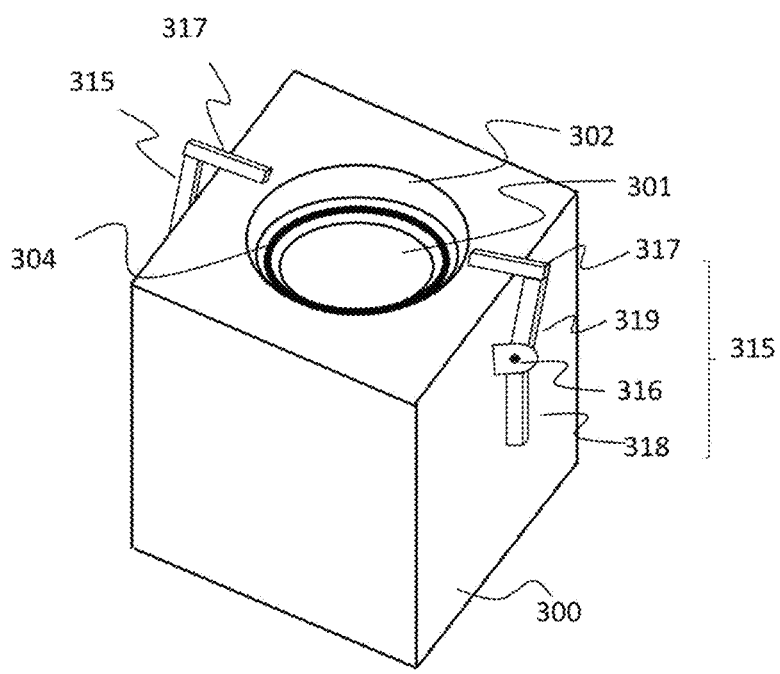
FIG. 9 is a perspective view of an applicator for storing the above-described sample holder therein.
Figure 10:
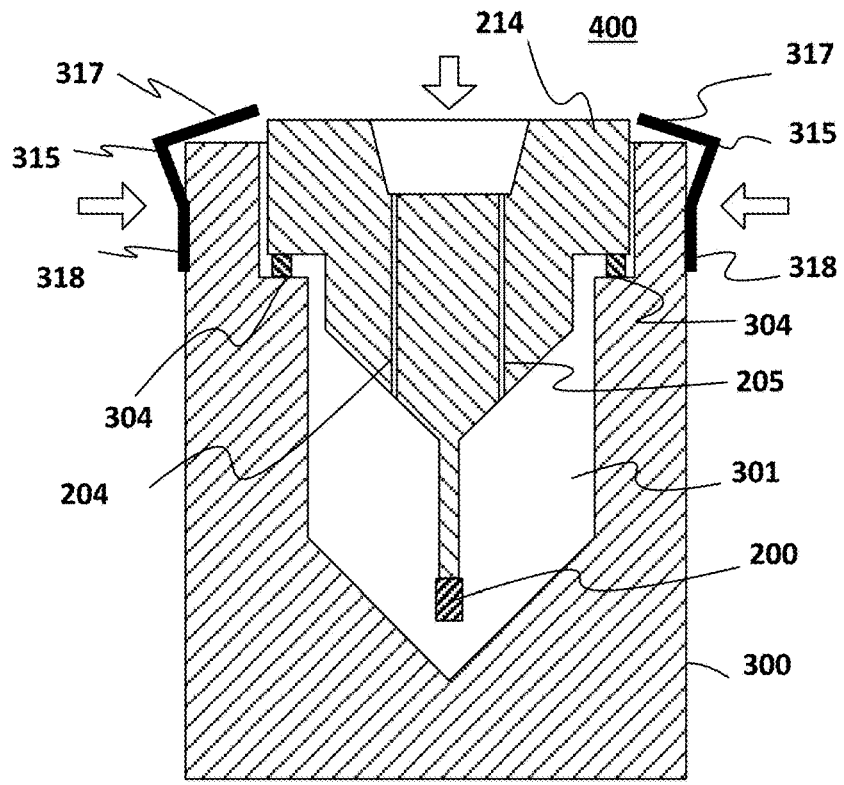
FIG. 10 is an explanatory diagram showing a sample holder unit in a state where the above-described sample holder is stored in the above-described applicator.

FIG. 9 shows a perspective view of an applicator 300 as a tool for storing the sample holder 214, and soaking a sample in a crystalline sponge 200, that is attached beforehand to the sample holder 214. FIG. 10 is a sectional diagram of a sample holder unit 400 comprising an applicator 300, and a sample holder 214 stored inside it.

The applicator 300, in whose inside a storing space 301 for storing the sample holder 214 is formed, and further at whose upper portion the sample holder 214 is fitted in and an opening 302 for taking it out is formed, is formed of a transparent or opaque member such as for example, glass, a resin, metal or the like. On an annular bottom surface of the opening 302, provided is, for example, an annular seal part (O-ring) 304, and during storing of the sample holder 214, the step part 208 of the sample holder 214 is airtightly maintained between the sample holder 214 and the applicator 300 by coming into contact with the seal part 304.

The inner diameter of the opening 302 of the applicator 300 is set to be slightly larger than the outer diameter of the base part 201 of the sample holder 214, and thus the inner wall of the opening 302 can be made to be a guide surface when inserting/ejecting the sample holder 214 thereinto/therefrom. Thus, preparation can be easily made without giving any damage to the sample S when removing the sample holder 214 comprising the crystalline sponge 200 in which a very small amount of a sample is soaked, from the applicator 300.

Symbols 315 and 315 representing a pair of put-out prevention parts (L-shaped swing levers) provided on side surfaces (side walls) of the applicator 300 swing in such a manner that their tips (lateral bars as described later) are moved to positions protruding and retracted to/from the inside of the opening 302. The put-out prevention parts 315 and 315 each are formed from a lateral bar 317 and a vertically upright bar that are formed into an L-shape, and the vertically upright bar comprises an upper portion 319 and a lower portion (operation part) 318 that are formed into a dog-legged shape. The upper portion 319 is connected to the lateral bar 317, and a boundary between the lower portion 318 and the upper portion 319 is supported by a lateral shaft 316 fixed on a side surface of the applicator 300 in a swingable manner. The put-out prevention parts 315 and 315 are energized in each direction (closing direction) where the tip of the lateral bar 317 protrudes toward the opening 302, with a spring that is not shown in the figure. Normally, the lateral bar 317 protrudes toward the opening 302 and the operation part 318 of the vertically upright bar is separated from the side surface of the applicator 300 by this energization. The lateral bar 317 is moved to a retracted position (open state) by pressing the operation part 318 in the side surface direction of the applicator 300 with hand fingers or a manipulator.

When storing the sample holder 214 in the applicator 300, the operation part 318 of the pull-out prevention part 315 is pressed in a horizontal arrow direction as shown in FIG. 10 with hand fingers or the like to insert the sample holder in the opening 302 in a state where the lateral bar 317 of the pull-out prevention part 315 is opened. Next, when releasing the pressing force in the horizontal arrow direction, that is applied to the operation part 318 of the pull-out prevention part 315 while pushing down the sample holder 214, the pull-out prevention part 315 is rotated by force energized by a spring, and the lateral bar 317 protrudes toward the opening 302.

Figure 11:
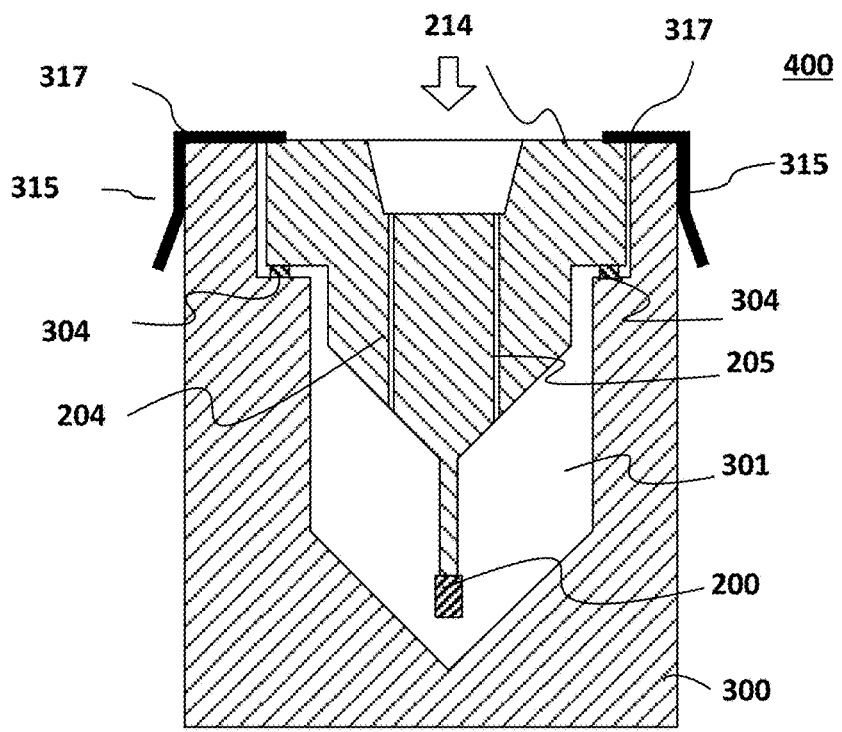
FIG. 11 is an explanatory diagram showing a sample holder unit in the state where the above-described sample holder is stored in the above-described applicator.

When showing the above-described state in FIG. 11, the lateral bar 317 of the pull-out prevention part 315 is engaged with the upper surface of the sample holder 214, and thus the sample holder is prevented from being pulled out from the opening 302 of the applicator 300. In addition, each position of engaging the lateral bar 317 with the upper surface of the sample holder 214 is a position avoiding through-holes 204 and 205.

Figure 12:
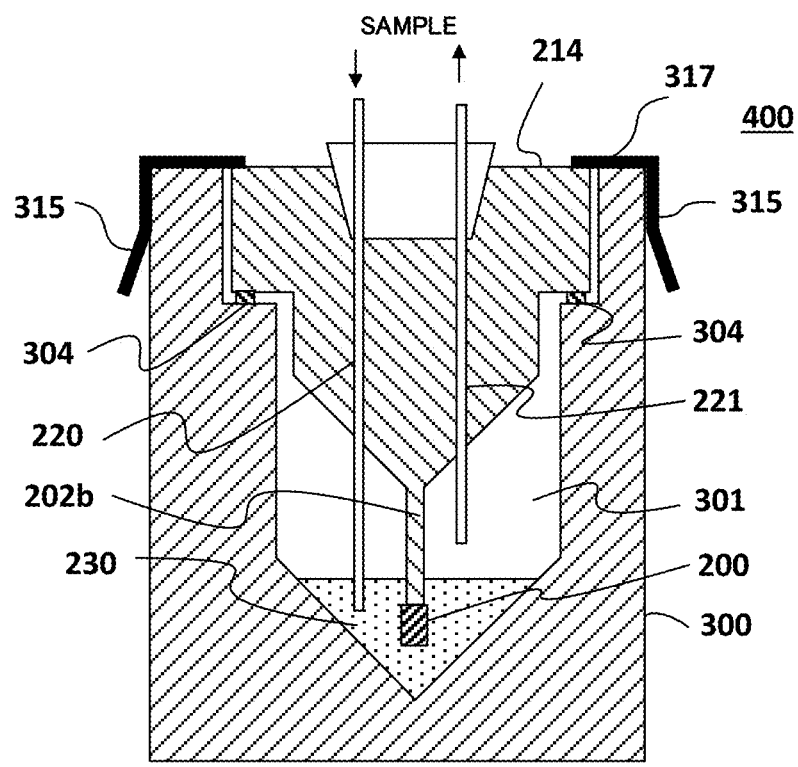
FIG. 12 is an explanatory diagram showing a step of soaking a sample introduced from a sample introduction pipe in a crystalline sponge.

FIG. 12 shows a step of introducing a sample into the applicator 300. Sample introduction pipes (hereinafter, also referred to simply as pipes) 220 and 221 each as a sample introduction structure are inserted into the respective through-holes 204 and 205 of the sample holder 214. In FIG. 12, symbol 230 represents a hydrophobic solvent (for example, cyclohexane) injected at the bottom part of the applicator 300, and setting is made to a level at which the crystalline sponge 200 at the tip part of the sample holding part 202b is immersed to fill it therewith. The pipe 220 is a sample injection pipe, and the pipe 221 is a discharge pipe. The tip of the pipe 220 extending to the vicinity of the crystalline sponge 200 is dipped in the solvent 230, and the tip of the pipe 221 extends to a position of not being immersed in the solvent 230. In FIG. 12, when a sample (for example, gas) is injected from the injection pipe 220, the sample is penetrated in the solvent 230, and soaked into the crystalline sponge 200 inside the solvent. The sample (comprising a solvent or a carrier) excessively supplied thereto is discharged outside via the pipe 221.

Thereafter, in the present example, the pipes 220 and 221 are simultaneously pulled out, and the sample holder 214 comprising the crystalline sponge 200 in which the sample is soaked is subsequently attached to the goniometer head 15 at the tip of the goniometer 12. In addition, the sample holder 214 and the applicator 300 as a tool to be handled therefor are used together in combination as a sample holder unit 400, and are prepared by the number required for an analysis operation and stored in a box-shaped container, that is, are also possible to be provided as a set.

According to the sample holder unit 400 with the above-described configuration, the crystalline sponge 200 attached to the tip of the pin-shaped holding part 202b (corresponding to a goniometer head pin) constituting part of the sample holder 214 can be safely and easily handled without damage, or deviation from the sample holder 214. That is, the crystalline sponge 200 in which a very small amount of the sample is soaked can be safely, simply and easily prepared on the goniometer head 15 in a short and quick period of time in such an extent that no damage occurs due to drying, without any damage due to taking only it out from a soaking container unlike a conventional manner. According to the present Example, the sample holder 214 with which soaking of the sample is completed is removed from the applicator 300, and is attached to the goniometer head 15 (Refer to FIG. 7A) at the tip portion of the goniometer 12. In this manner, the sample S soaked in the crystalline sponge 200 is easily, precisely and quickly arranged at a predetermined position inside the single-crystal X-ray diffractometer 9 without requiring highly specialized knowledge and precise operations.

<Introduction of Sample by Soaking Apparatus (Soaking Machine)>

Next, described is soaking a sample in the crystalline sponge 200 inside the sample holder unit 400 (Refer to FIGS. 10 to 12) with the above-described configuration, that is performed using a soaking machine.

Figure 13:
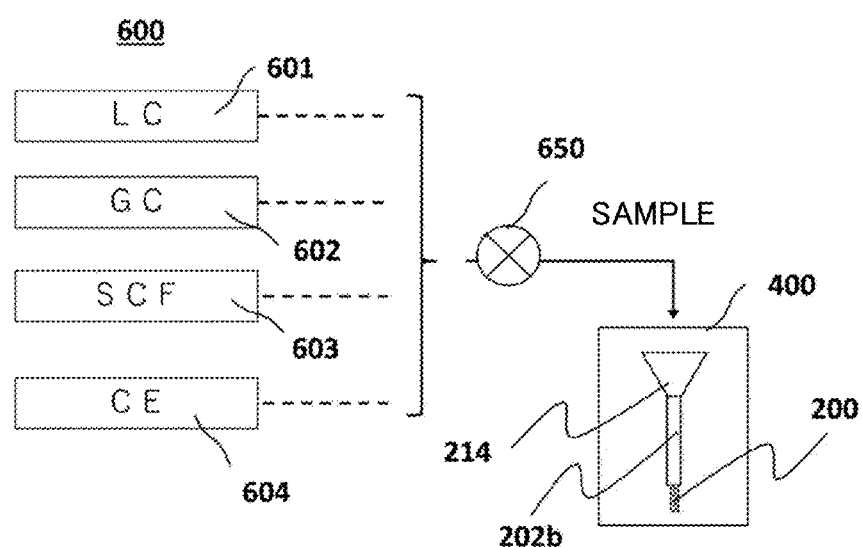
FIG. 13 is a diagram showing one example of a pretreatment apparatus used in single-crystal X-ray structure analysis.

In FIG. 13, a very small amount of the sample S extracted by LC (liquid chromatography) 601, GC (gas chromatography) 602, and further, SFC (supercritical fluid chromatography) 603, CE (capillary electrophoresis) 604 and so forth that constitute a pretreatment device 600 is supplied to a pair of the sample introduction pipes 220 and 221 inserted in the through-holes 204 and 205 of the sample holder 214 via the soaking apparatus (soaking machine) 650 provided with every kind of a switching valve and a pressure adjustment device, that supplies a fluid under the necessary conditions (flow rate and pressure), and the sample is selectively introduced into the storing space 301 inside the applicator 300. That is, the sample is sent to the sample introduction pipe 220 on the supply side from the supply side pipe, and is supplied to the sample holder 214 inside the applicator 300 from the tip portion of the sample introduction pipe 220 on the supply side. Only the sample, or a solution in which the sample and the preserving solvent are mixed is supplied by flowing inside the sample introduction pipe 220 on the supply side. In this manner, a very small amount of the sample S introduced thereinto comes into contact with the crystalline sponge 200 attached to the tip of the pin-shaped holding part 202b of the sample holder 214 inside the storing space 301 of the applicator 300, and the sample is soaked therein. In addition, examples of the electrophoresis device herein include various electrophoresis devices concerning capillary electrophoresis, isoelectric point electrophoresis, and so forth. When using a soaking machine, in a state where the sample is injected thereinto, the excessive sample or a solution in which the sample and the preserving solvent are mixed is discharged from the sample introduction pipe 221 on the discharge side, after a predetermined time has elapsed. When not using the soaking machine, the unnecessary preserving solvent or solution flows inside a sample introduction pipe 221 on the discharge side, and is discharged. Accordingly, it is possible that no sample flows through the sample instruction pipe 221 on the discharge side. In addition, when a gas and a supercritical fluid each are set as a carrier, the carrier containing a sample is discharged.

<Attaching a Sample Holder into Single-Crystal X-Ray Structure Analysis Apparatus>

Next, attaching a sample holder unit into a single-crystal X-ray structure analysis apparatus is described, the sample holder unit comprising a crystalline sponge in which the sample according to the Example 1 is soaked.

Figure 14:
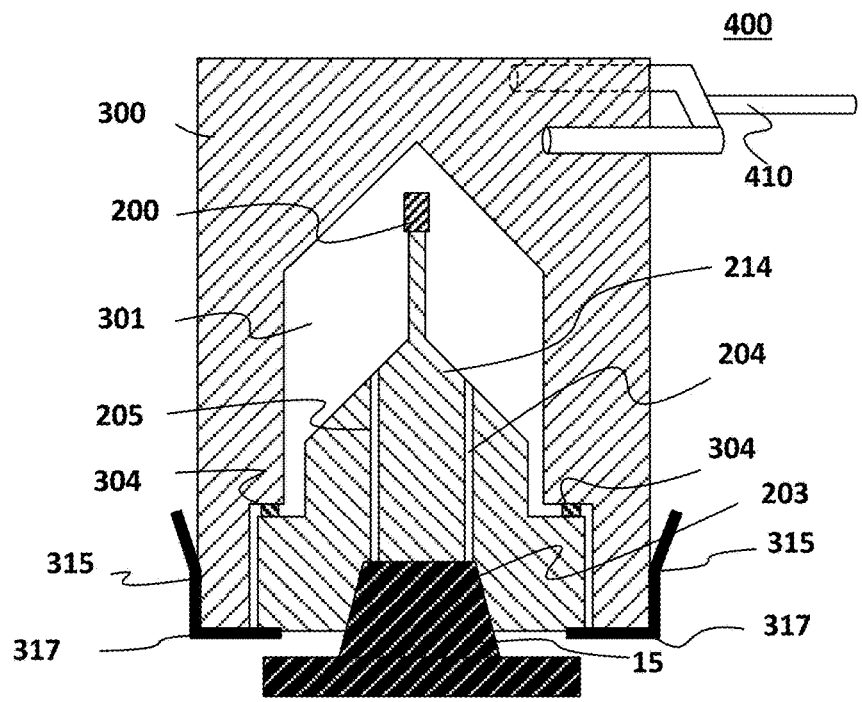
FIG. 14 is an explanatory diagram showing a step of attaching a sample holder unit to a single-crystal X-ray structure analysis apparatus.

After soaking the sample in the crystalline sponge 200 as shown in FIG. 12, the pipes 220 and 221 are pulled out, and the sample holder unit 400 formed from the sample holder 214 comprising the crystalline sponge 200 in which the sample is soaked, and the applicator 300 for storing the sample holder is attached to the goniometer head 15 at the tip of the goniometer 12 in the single-crystal X-ray diffractometer 9 in the upside-down attitude (in the state where the crystalline sponge 200 is directed upward) by being held with hand fingers, a manipulator 410 or the like, as shown in FIG. 14. At this time, a portion of the attachment part 203 of the sample holder 214 is attached to the goniometer head 15.

Figure 15:
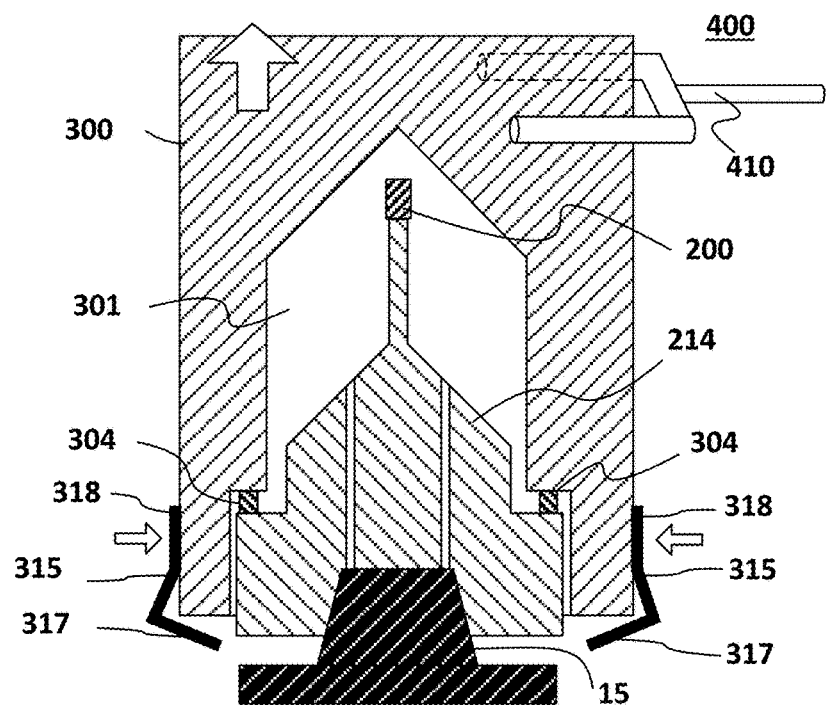
FIG. 15 is an explanatory diagram showing a state of having attached the above-described sample holder unit to the single-crystal X-ray structure analysis apparatus.

Next, as shown in FIG. 15, the operation parts 318 of the pull-out prevention parts 315 on both sides are pressed in the horizontal arrow directions by hand fingers or the like to open the lateral bars 317. The pull-out prevention of the sample holder 214 is released by disengaging the pull-out prevention parts 315 from the sample holder 214. The applicator 300 is separated from the sample holder 214 by elasticity of the seal part 304, and thus rises in the vertical arrow direction. Then, only the sample holder 214 is to be a state of being attached to the goniometer head 15 at the tip of the goniometer 12 by holding and raising the applicator 300 with hand fingers, a manipulator 410 or the like. At this time, the sample holder 214 is easily and precisely attached to the goniometer head 15 at the tip thereof by a magnet or the like at the attachment part 203.

In addition, as described above, when the pull-out prevention parts are released, it is so constituted that the applicator 300 is separated from the sample holder 214 by the elasticity of the seal part 304, and thus the seal part 304 serves as separation means of separating (pulling apart) the applicator 300 from the sample holder 214, together with a sealing function. The other means such as a spring or the like energized so as to separate between the applicator 300 and the sample holder 214, other than the seal part 304 may be provided for this separation means. This separation means is similarly applied to Example 2 and Example 3 as well as described later.

Example 2

Figure 16:
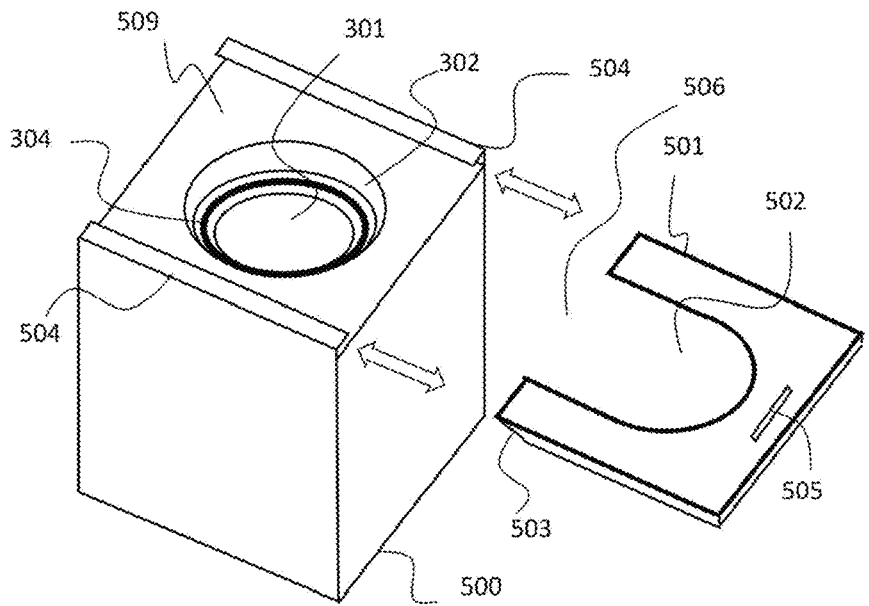
FIG. 16 is a perspective view showing an applicator of Example 2, according to the present invention.
Figure 17:
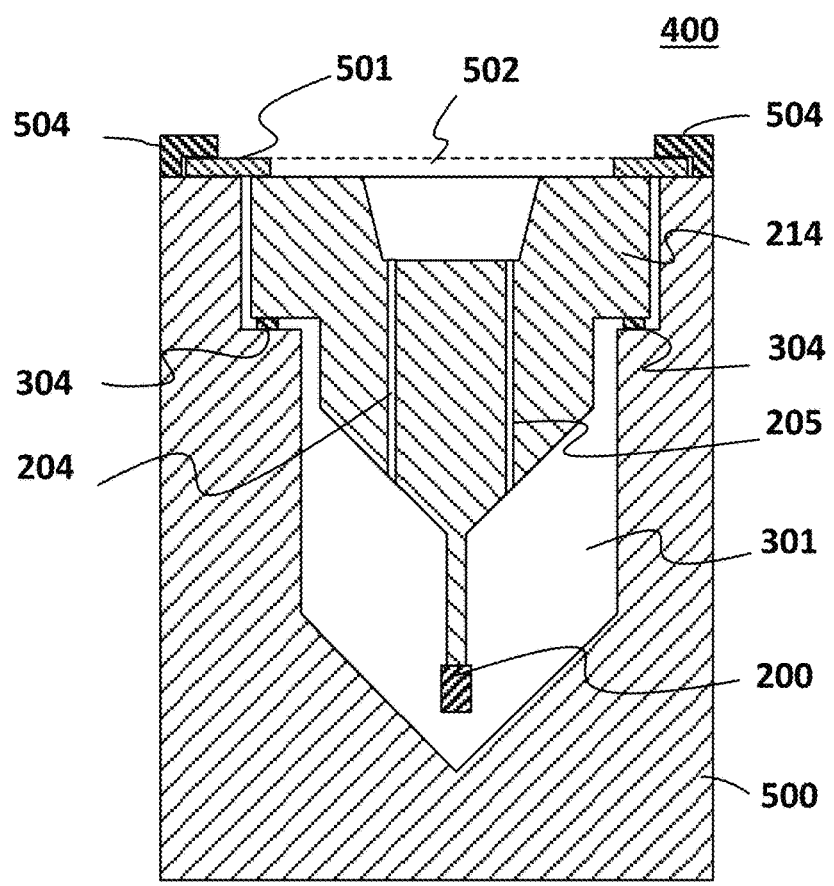
FIG. 17 is an explanatory diagram showing a state of storing a sample holder in the above-described applicator, according to the same.

FIG. 16 is a perspective view showing the applicator 500 of Example 2, according to the present invention; FIG. 17 shows a cross-section of a sample holder unit according to the same; and the same symbols are given the same portions as those in Example 1. Symbol 501 represents a plate-shaped pull-out prevention part (sliding part) that protrudes toward the opening 302 by sliding in the lateral direction along an opening surface 509 of the applicator 500. The pull-out prevention part 501 is engaged with the upper surface of the sample holder 214 stored in the applicator 500 in an attached state thereof, and prevents the sample holder 214 from being pulled out from the opening 302. Symbols 504 and 504 represent guide rails each whose cross-section is U-shaped, the guide rails are arranged so as to extend in parallel at both side portions of the opening surface 509. The pull-out prevention part 501 whose both side ends (engagement parts) are engaged with the guide rails 504 and 504 is slidably guided in both directions of each arrow.

The pull-out prevention part 501 having a U-shaped opening part 502 in the central part is provided with an operation part 505 on the U-shaped circular arc side of the opening part 502 that is opened on the other side 506. Attaching the pull-out prevention part 501 to the applicator 500 is performed by pressing the operation part 505 with hand fingers or a manipulator while pushing down the upper surface of the sample holder 214, and sliding the pull-out prevention part 501 (Refer to FIG. 17).

The pull-out prevention part 501 whose opening part 502 has an inner diameter smaller than an outer diameter of the base part 201 of the sample holder 214 is engaged with only the outer peripheral portions of the upper surface of the sample holder 214 so as not to cover the through-holes 204 and 205, when it is attached into the applicator 500. The pull-out prevention part 501, at a front end of which an inclined surface 503 is provided to a sliding lower surface, is made to be attached thereto while pushing down the upper surface of the sample holder 214 by the inclined surface 503 via sliding and engaging therewith, and sliding between the upper surface of the sample holder 214 and the opening surface 509 of the applicator 500 is smoothly performed.

When soaking the sample in the crystalline sponge 200, the sample introduction pipes 220 and 221 are inserted into the through-holes 204 and 205 of the sample holder 214, that are exposed to the opening part 502 of the pull-out prevention part 501 in the state where the pull-out prevention part 501 is attached thereto to introduce the sample similarly to Example 1.

Figure 18:
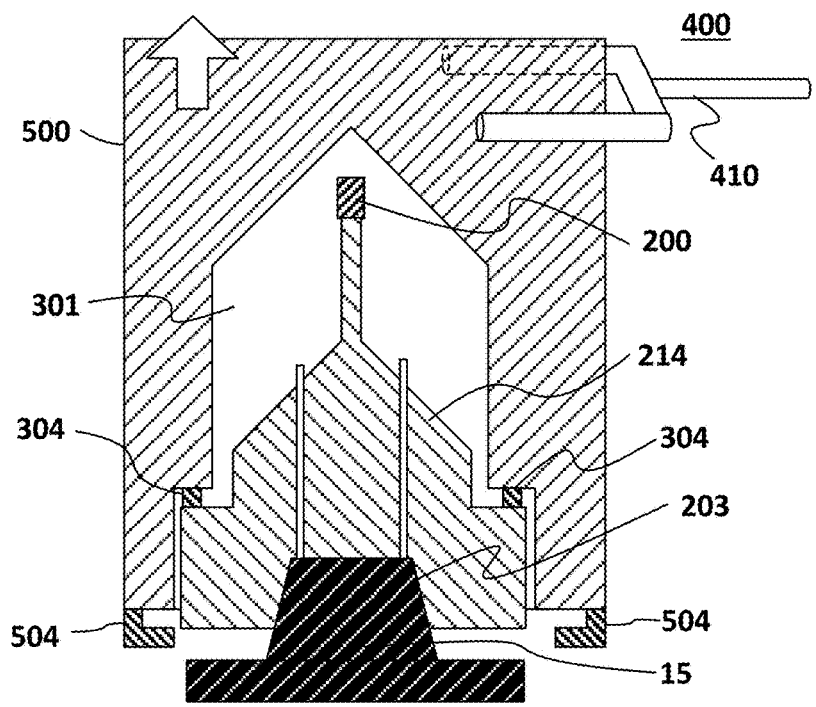
FIG. 18 shows a sectional view of a sample holder when attaching it to a goniometer in a single-crystal X-ray structure analysis apparatus, according to the same.

FIG. 18 shows a sectional view at the time when a sample holder unit according to Example 2 is attached to a goniometer in a single-crystal X-ray structure analysis apparatus. The sample holder unit 400 as shown in FIG. 17 is attached to the goniometer head 15 at the tip of the goniometer 12 in the upside-down attitude with hand fingers, a manipulator 410 or the like as shown in FIG. 18. At this time, the attachment part 203 portion of the sample holder 214 is attached to the goniometer head 15 at the tip of the goniometer 12.

Next, the pull-out prevention part 501 is pulled out in the direction (right direction in FIG. 16) opposite to that at the time of its attachment thereto by operating the operation part 505 with hand fingers, a manipulator 410 or the like. When the pull-out prevention part 501 is pulled out from the applicator 500, the applicator 500 is separated from the sample holder 214 by elasticity of the seal part 304 by releasing the pull-out prevention of the sample holder 214, and thus rises in the vertical arrow direction. Then, only the sample holder 214 remains attached to the goniometer head 15 at the tip of the goniometer 12 by holding and raising the applicator 300 with hand fingers, a manipulator 410 or the like. Similarly to Example 1, the sample holder 214 is easily and precisely attached to the goniometer head 15 at the tip of the goniometer 12 by a magnet or the like at the attachment part 203. The sample holder 214 is freely attached to the tip portion of the goniometer 12 in an attachable/detachable manner by this positioning mechanism.

According to Example 2, the pull-out prevention can be easily and surely performed since a pull-out prevention part is attached thereto by sliding; and the sample holder 214 can be quickly, easily and precisely attached to the goniometer 12 while protecting the crystalline sponge 200, since the sample holder 214 together with the applicator 500 is carried and attached to the goniometer 12, and only the applicator 500 is subsequently separated therefrom.

Example 3

Figure 19:
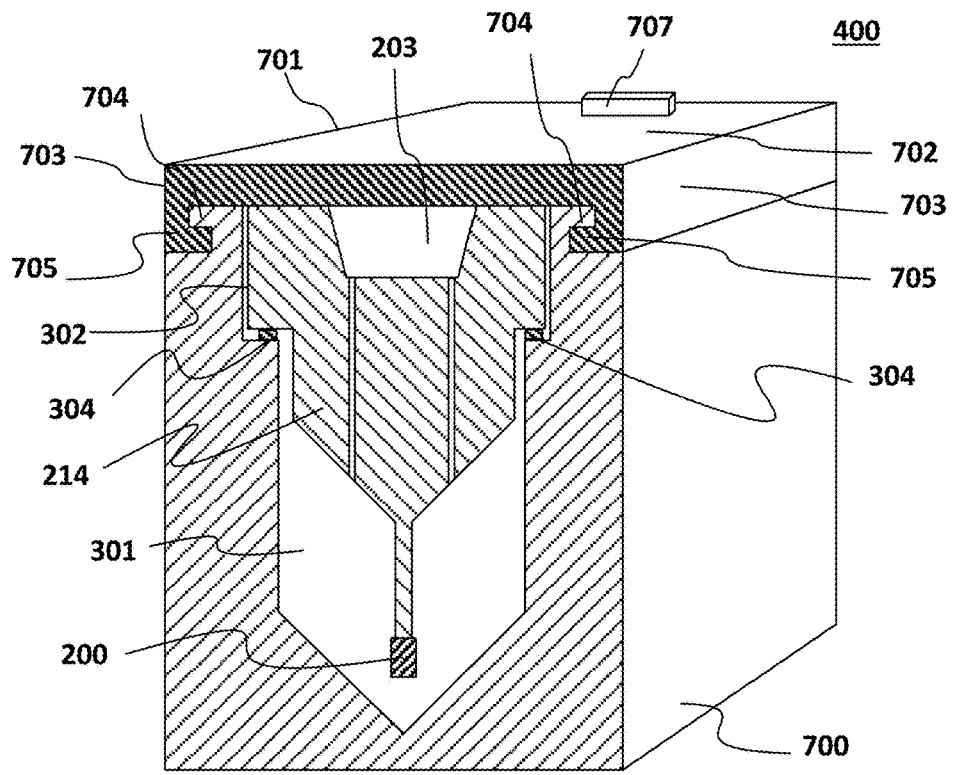
FIG. 19 is a perspective view of a sample holder unit shown with a partial cross-section according to Example 3 of the present invention.

FIG. 19 is a perspective view in which a sample holder unit 400 is shown with a partial cross-section according to Example 3 of the present invention, and the same symbols are given the same portions as those in Example 2. FIG. 19 shows a state of attachment thereof into an applicator by the pull-out prevention part 701, and it is omitted to show a U-shaped opening part (Refer to symbol 502 in FIG. 16) of a pull-out prevention part according to Example 2.

Symbol 700 represents an applicator, and symbol 701 represents a pull-out prevention part (sliding part) for sliding an opening (that is not shown in the figure) of the applicator 700, that is formed of a resin or the like in plate thickness exhibiting high mechanical strength (about 10 atmospheric pressure). Symbols 704 and 704 representing a pair of guide rails arranged in parallel so as to extend in the lateral direction at both side portions above the applicator 700 exhibit high mechanical strength, the guide rails each whose face is U-shaped, are formed in plate thickness exhibiting strength (about atmospheric pressure). Symbols 705 and 705 representing engagement parts at both side ends 703 of the pull-out prevention part 701, the engagement parts each whose cross-section is channel-shaped (U-shaped), are formed of a resin or the like exhibiting high mechanical strength so as to be engaged with the guide rails 704 and 704. Symbol 707 representing a protrusion-shaped operation part provided on a top plate 702 of the pull-out prevention part 701 is used for a sliding operation of the pull-out prevention part 701. Further, it is omitted to show the figure, but similarly to Example 2, an inclined surface is provided to a sliding lower surface at a front end of the pull-out prevention part 701, and smooth sliding between the sample holder 214 and the applicator 700 is made possible.

The attachment thereof into the applicator 700 is performed by engaging the engagement parts 705 and 705 of the pull-out prevention part 701 with the guide rails 704 and 704, and slidably operating the operation part 707 in the arrow direction with hand fingers, a manipulator or the like. The pull-out prevention part 701 is engaged with the upper surface of the sample holder 214 in the attached state thereof, and suppresses the pull-out thereof from the applicator 700. The removal of the pull-out prevention part 701 therefrom is carried out by operating the operation part 707 in the direction opposite to that at the time of attachment thereof to remove the pull-out prevention part 701 from the guide rails 704 and 704.

During attachment thereof into a single-crystal X-ray structure analysis apparatus, the sample holder unit 400 shown in FIG. 19 is held by hand fingers, a manipulator or the like, and is attached to the goniometer head 15 at the tip of the goniometer 12 in the upside-down attitude. At this time, the attachment part 203 of the sample holder 214 is attached to the goniometer head 15 at the tip of the goniometer 12. Next, in the state of pressing the applicator 700, the pull-out in the direction (right direction in FIG. 16) opposite to that at the time of attachment thereto is performed by operating the operation part 707 with hand fingers, a manipulator 410 or the like. The applicator 700 is separated from the sample holder 214, and raised with elasticity of the seal part 304 by pulling out the pull-out prevention part 701. Then, when the applicator 700 is held and raised by hand fingers, a manipulator or the like, only the sample holder 214 remains attached to the goniometer head 15 at the tip of the goniometer 12.

According to Example 3, similarly to Example 1 and Example 2, the sample holder 214 together with the applicator 700 is carried and attached to the goniometer 12, and only the applicator 700 is subsequently separated therefrom, and thus the sample holder 214 can be quickly, easily and precisely attached to the goniometer 12 while protecting the very small and fragile crystalline sponge 200.

As described above in detail, according to a sample holder unit for a single-crystal X-ray structure analysis apparatus of the present invention, the single-crystal X-ray structure analysis using a very small and fragile crystalline sponge can be quickly, surely and easily performed without accompanying the conventionally required fine and precise operation, even if not having specialized knowledge of X-ray structure analysis, in other words, there is provided the sample holder unit capable of realizing a very versatile and user-friendly single-crystal X-ray structure analysis apparatus that is capable of high-yield and efficient performance of the single-crystal structure analysis using the crystalline sponge. Further provided is a sample holder unit having a configuration more adaptable to the actual sample preparation operation.

In the step of soaking a sample into the crystalline sponge 200, the sample is supplied to the sample holder unit 400 set to a temperature, a pressure and so forth that are suitable for soaking from the soaking apparatus (soaking machine) 650 (Refer to FIG. 13) under the suitable conditions for soaking (a pressure, a flow rate and so forth). Thus, the inside of the sample holder unit 400 needs to correspondingly deal with various temperatures and pressures. In the present Example 3, the pull-out prevention part 701, the engagement part 705 and the guide rails 704 in plate thickness exhibiting high mechanical strength (about 10 atmospheric pressure) are used, and further, the engagement part 705 and the guide rails 704 each are formed into its channel-shaped (U-shaped) cross-section type exhibiting high mechanical strength (about 10 atmospheric pressure), thereby being responsively and sufficiently endurable in the foregoing.

In addition, though various examples according to the present invention are described above, the present invention is not limited to the above-described Examples and includes various modified examples. For example, the above-described Examples describe the entire system in detail in order to facilitate understanding of the present invention, but are not necessarily limited to those having all the configurations that have been described. Further, a part of a configuration of one Example may be replaced with a configuration of another Example; further, a configuration of another Example may also be added to a configuration of one Example; and with respect to a part of a configuration of each Example, further performed may be addition/deletion/replacement of another configuration.

The present invention is widely applicable for an X-ray structure analysis apparatus used for searching a material structure, a method thereof, and so forth.

In addition, the present international application claims priority under Japanese Patent Application No. 2018-219782, filed Nov. 22, 2018, and the entire content of Japanese Patent Application No. 2018-219782 is applied to the present international application.

EXPLANATION OF THE SYMBOLS

1 . . . Single-crystal X-ray structure analysis apparatus (whole); 9 . . . Single-crystal X-ray diffractometer; 11 . . . X-ray tube; 12 . . . Goniometer; 15 . . . Goniometer head; 22 . . . X-ray detector; 102 . . . Measurement device; 103 . . . Input device; 104 . . . Image display device; 107 . . . CPU; 108 . . . RAM; 109 . . . ROM; 111 . . . Hard disk; 116 . . . Analysis application software; 117 . . . Measurement application software; 200 . . . crystalline sponge; 201 . . . Base part; 202 . . . Protrusion part; 204, 205 . . . Through-hole; 214 . . . Sample holder; 300, 500, 700 . . . Applicator; 301 . . . Storing space; 302 . . . Opening; 220, 221 . . . Sample introduction pipe (Pipe); 315, 501, 701 . . . Pull-out prevention part; 318, 505, 707 . . . Operation part; and 400 . . . Sample holder unit.

The invention claimed is:
1. A sample holder unit comprising a sample holder used in a single-crystal X-ray structure analysis apparatus, and an applicator in which the sample holder is stored,
   the sampled holder comprising:
   a base part attached to a goniometer in the single-crystal X-ray structure analysis apparatus, the base part formed to have a sample introduction structure into which a sample to be soaked in a porous complex crystal is introduced; and a holding part that holds the porous complex crystal capable of soaking the sample in a plurality of fine pores formed therein, the holding part formed on the base part, and the applicator comprising:

an opening and a storing space in which the sample holder is stored, and a pull-out prevention part that selectively prevents and releases the sample holder stored in the storing space from being pulled out from the opening, wherein the pull-out prevention part comprises an operation part that releases pull-out prevention thereof in a state where the sample holder stored in the applicator is attached to the goniometer, and the applicator further comprises a separation mechanism to separate the sample holder therefrom by releasing the pull-out prevention with the operation part.

2. The sample holder unit according to claim 1, wherein the separation mechanism comprises a seal part with which a contact surface between the applicator and the sample holder stored therein is airtightly maintained.

3. The sample holder unit according to claim 2, wherein the pull-out prevention part prevents the sample holder from being pulled out therefrom in a state of pressing the sample holder to the seal part.

4. The sample holder unit according to claim 1, wherein the pull-out prevention part that protrudes toward the opening of the applicator comprises a swing lever that prevents the sample holder from being pulled out therefrom.

5. The sample holder unit according to claim 1, wherein the pull-out prevention part that protrudes toward the opening of the applicator has a shape that prevents the sample holder from being pulled out therefrom.

6. The sample holder unit according to claim 5, wherein the pull-out prevention part has an inclined surface at an end of a sliding surface of the pull-out prevention part with the sample holder.

7. The sample holder unit according to claim 5, wherein the applicator has a pair of parallel guide rails provided at both side portions of the applicator, and the pull-out prevention part slides to be engaged with the pair of parallel guide rails.

8. The sample holder unit according to claim 5, wherein the applicator has a pair of parallel guide rails provided at both side portions of the applicator; the pull-out prevention part comprises engagement parts that slide to be engaged with the pair of parallel guide rails; and the pair of parallel guide rails and the engagement parts each whose cross-section is U-shaped are formed.

9. The sample holder unit according to claim 1, wherein the pull-out prevention part that protrudes toward the opening of the applicator comprises a swing lever that prevents the sample holder from being pulled out therefrom.

10. The sample holder unit according to claim 2, wherein the pull-out prevention part that protrudes toward the opening of the applicator comprises a swing lever that prevents the sample holder from being pulled out therefrom.

11. The sample holder unit according to claim 3, wherein the pull-out prevention part that protrudes toward the opening of the applicator comprises a swing lever that prevents the sample holder from being pulled out therefrom.

12. The sample holder unit according to claim 1, wherein the pull-out prevention part that protrudes toward the opening of the applicator has a shape that prevents the sample holder from being pulled out therefrom.

13. The sample holder unit according to claim 2, wherein the pull-out prevention part that protrudes toward the opening of the applicator has a shape that prevents the sample holder from being pulled out therefrom.

14. The sample holder unit according to claim 3, wherein the pull-out prevention part that protrudes toward the opening of the applicator has a shape that prevents the sample holder from being pulled out therefrom.

15. The sample holder unit according to claim 6, wherein the applicator has a pair of parallel guide rails provided at both side portions of the applicator, and the pull-out prevention part slides to be engaged with the pair of parallel guide rails.

16. The sample holder unit according to claim 6, wherein the applicator has a pair of parallel guide rails provided at both side portions of the applicator; the pull-out prevention part comprises engagement parts that slide to be engaged with the pair of parallel guide rails; and the pair of parallel guide rails and the engagement parts each whose cross-section is U-shaped are formed.

* * * * *